UNITED STATES PATENT OFFICE.

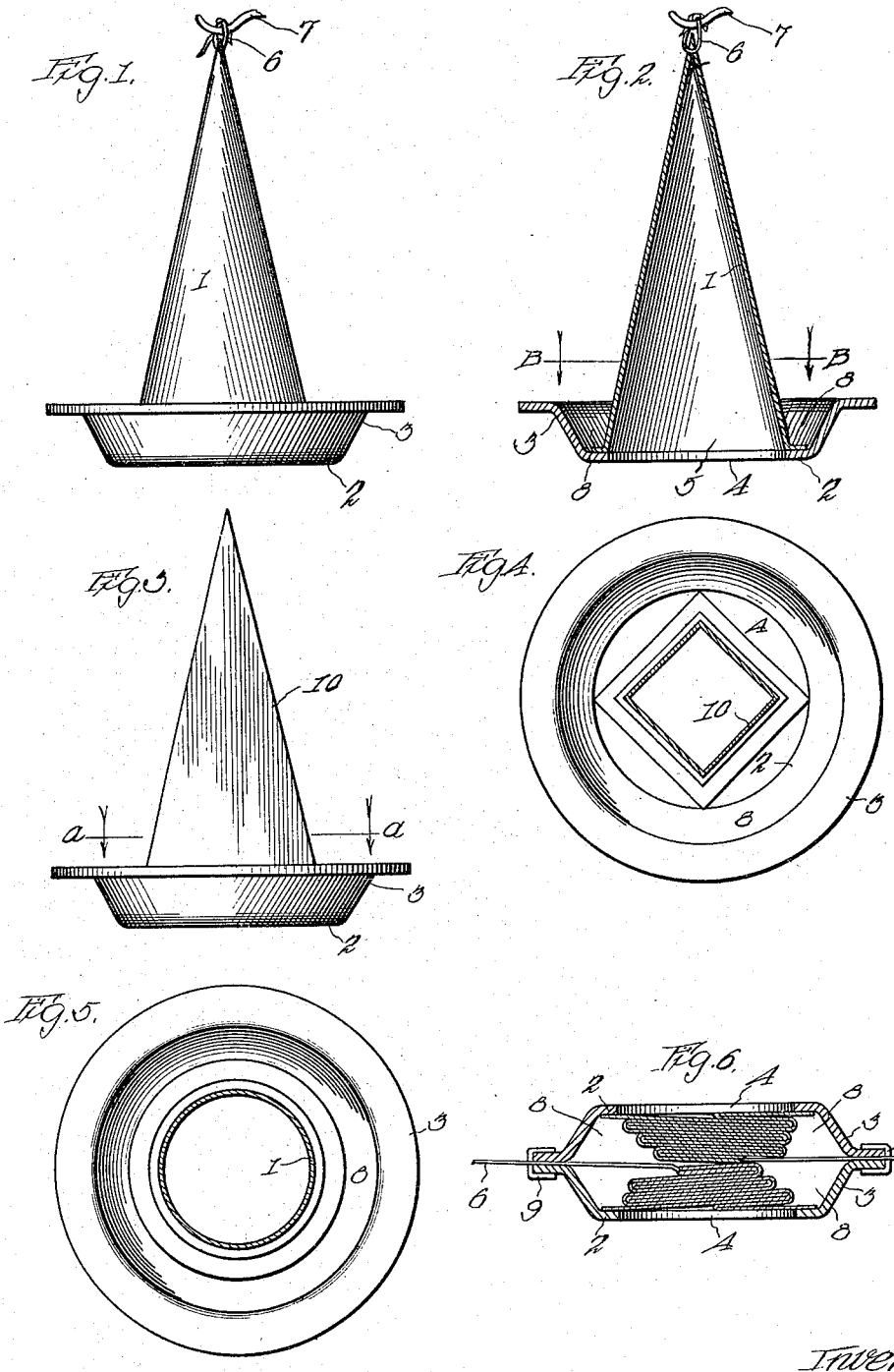

ANNA HENNING, OF CHICAGO, ILLINOIS.

INSECT-CATCHING DEVICE.

1,176,961.  Specification of Letters Patent.  Patented Mar. 28, 1916.

Application filed July 10, 1915. Serial No. 39,059.

*To all whom it may concern:*

Be it known that I, ANNA HENNING, a subject of the Emperor of Germany, residing at 3469 North Kedzie avenue, in the city of Chicago, county of Cook, and State of Illinois, have invented certain new and useful Improvements in Insect-Catching Devices, of which the following is a complete specification.

My invention relates to improvements in insect catching devices and more particularly to devices of this character which are adapted to catch flies or the like.

The objects of my invention are to so construct the device that it may be collapsed and packed in a compact form for convenient transportation, that it may be readily opened or distended for use and which when opened may be hung from or placed at any desired point, and to so assemble two or more of the devices in a collapsed compact package that the adhesive composition with which it is in part coated, is covered, concealed from view and protected and is quickly brought into view and operating position by separating the package and opening the devices. These and other objects I accomplish as hereinafter set forth and described and as particularly pointed out in the appended claims, reference being had to the accompanying drawings in which adaptations or embodiments of my invention are shown.

In the drawings: Figure 1, represents a side elevation of one form of my improved device. Fig. 2 is a vertical central longitudinal section through the form of my device shown in Fig. 1. Fig. 3, is a side elevation of another form of my improved device. Fig. 4, is a transverse section through the form shown in Fig. 3, taken on line *a—a* in said Fig. 3, and looking downward in the direction of the arrows. Fig. 5, is a transverse section through the form of my improved device shown in Figs. 1 and 2, and taken on line B—B in Fig. 2, and looking downward in the direction of the arrows. Fig. 6 is a central vertical section through two of the devices fastened together to form a compact package.

In referring to the accompanying drawings in detail, like numerals indicate corresponding parts in the adaptations or embodiments of my invention shown therein.

My improved insect catching device comprises an insect catching member which is coated on its exterior surface with an adhesive composition and is preferably of a hollow or tubular form and a supporting member or plate attached to the lower extremity of said insect catching member.

The insect catching member as shown in Figs. 1, 2 and 5, is constructed in the form of a hollow cone 1, and a circular plate 2, which constitutes the supporting member and is provided with an offset or raised brim or flange 3, and a circular central opening 4, which is equal in circumference to the circular lower mouth 5, of the cone 1, as shown in Fig. 2. The upper or outer portion of the brim is bent outwardly to form a flat annular marginal top portion or flange which stiffens and strengthens the brim and provides means for the attachment of a fastener as will be more specifically described further on. The lower edge of the cone is also bent outwardly to form a flat annular flange which is cemented or otherwise suitably secured to the top surface of the circumferential, surrounding marginal edge of the central opening 4 in the plate 2, substantially as shown in Fig. 2. A cord 6 or other desirable means may be attached to the apex of the cone by which it can be hung or suspended from a hook 7, or other article. The circular brim or flange 3 provides a drip trough 8 of annular form which surrounds the lower end of the cone 1, as shown in Fig. 2.

My improved device is adapted to have the cone 1, collapsed or interfolded upon itself and I prefer to arrange two of the devices in opposed collapsed position with the top marginal portions or flanges of the two opposed brims closely superimposed together substantially as shown in Fig. 6 and to detachably secure them together by fitting U-shaped fasteners 9, over the said top marginal flanges or outer portions of the brims 3 of the plates 2. In this way the adhesive composition with which the cones are coated on their exterior surface is concealed from view, covered and protected together with the collapsed cones between the opposed plates which thus constitute an inclosing housing for them and form an exceedingly small and compact package which can be conveniently transported.

When it is desired to use the devices, the fasteners 9 are removed and the cone of each device opened or distended by inserting a hand or a suitable tool through the opening 4, in the plate and pushing the cone into the form shown in Figs. 1 and 2. The devices can thus be suspended from any desired object by means of the cord 6, or may be placed in upright position upon a table or other suitable article.

In the form of my invention shown in Figs. 3 and 4, the insect catching member is made tapering but of a square shape in cross section and is indicated in these figures by the numeral 10. For some purposes this form may be preferable, as owing to its flat sides it may be more easily collapsed or folded.

While this device is chiefly adapted for and is usually employed to catch the common house fly, it can be utilized also for the purpose of catching various other small insects if desired.

The bottom of the supporting plate is made flat and unprovided with any inner raised or elevated portions and the member 1, has its enlarged lower end attached directly to the surface of the bottom so that it may be folded entirely within the raised brim and in horizontal alinement with or below the horizontal plane of the top stiffening flange so that the folded member will be completely within the dish as shown in Fig. 6, and will not project above the top flange.

The chief advantage of this construction is that the flanges of the two opposed dishes may be brought into close contact throughout, thereby completely covering and protecting the folded member and also that when the two members are separated and before they are unfolded, they lie within the brims and do not project above the top flanges.

The exterior of the member is coated with any of the well known adhesive compositions usually employed in fly papers and the like as previously described.

While I have illustrated and described preferred forms of construction for carrying my invention into effect this is capable of a wide range of variation, alteration, modification and change without departing from the spirit of my invention. I therefore do not wish to be limited to the construction herein shown and described, but desire to avail myself of all such variations, alterations, modifications and changes as fairly fall within the scope of the appended claims or may be construed to be within the scope thereof by involving the doctrine of equivalents.

What I claim as my invention and desire to secure by Letters Patent is:

1. A package comprising two devices having collapsed and interfolded insect catching members and opposed plates forming an inclosing casing for said members having raised brims and flat stiffening flanges extending outwardly from said brims and superimposed together, and suitable means fitted upon the superimposed flanges for detachably fastening said plates to each other.

2. A package comprising two devices having collapsed and interfolding members coated with adhesive insect catching composition, plates attached to the outer extremities of said members and having opposed dished portions forming an inclosing housing for said members and flat marginal portions superimposed together and U-shaped fasteners fitted over said marginal portions.

3. A device of the class described, comprising a supporting plate having a bottom which is flat throughout and is provided with a central opening, a raised brim surrounding and extending laterally up from the outer margin of said flat bottom, and a top stiffening flange extending outward from the upper edge of the raised brim and a tapering hollow foldable insect catching member having its larger and lower extremity bent at an angle and attached directly to the bottom of the supporting plate around the central opening and within and below the flange, said insect catching member being folded completely in the plate upon the bottom thereof, when collapsed and entirely within the raised brim and in horizontal alinement with or below the top stiffening flange.

4. A device of the class described, a plate having a bottom and an outer surrounding raised brim extending laterally from the outer margin of the bottom, said bottom being substantially flat throughout and an insect catching member having its lower end bent horizontally outward and attached directly to the bottom and being constructed and arranged to be folded completely within the plate with no part thereof projecting above the brim whereby two collapsed devices may be fitted together in opposed position with their brims in contact and their folded insect catching members entirely concealed covered and protected between the plates.

In testimony whereof I hereunto affix my signature.

ANNA HENNING.

Copies of this patent may be obtained for five cents each, by addressing the "Commissioner of Patents, Washington, D. C."